(12) United States Patent
Grimes et al.

(10) Patent No.: US 6,686,585 B2
(45) Date of Patent: Feb. 3, 2004

(54) POSITION ENCODER WITH SCALE CALIBRATION

(75) Inventors: Donald L. Grimes, Milford, MA (US); Stuart E. Schechter, Newton, MA (US); Donald K. Mitchell, Wayland, MA (US)

(73) Assignee: Microe Systems Corporation, Natick, MA (US)

( * ) Notice: Subject to any disclaimer, the term of this patent is extended or adjusted under 35 U.S.C. 154(b) by 295 days.

(21) Appl. No.: 09/955,287

(22) Filed: Sep. 19, 2001

(65) Prior Publication Data

US 2003/0052260 A1 Mar. 20, 2003

(51) Int. Cl.$^7$ ................................................ G01D 5/34
(52) U.S. Cl. ................................ 250/231.13; 324/202
(58) Field of Search ........................ 250/231.13, 231.14, 250/231.16, 231.18; 324/202, 207.11, 207.12; 341/13, 118, 120; 702/85, 94

(56) References Cited

U.S. PATENT DOCUMENTS

| | | | |
|---|---|---|---|
| 4,507,647 A | 3/1985 | Minami et al. | 340/347 |
| 4,631,520 A | 12/1986 | Wingate | 340/347 |
| 4,912,468 A | 3/1990 | Rust | 341/119 |
| 6,029,363 A | 2/2000 | Masreliez et al. | 33/706 |
| 6,242,906 B1 | 6/2001 | Andermo | 324/202 |
| 6,304,825 B1 * | 10/2001 | Nowak et al. | 702/94 |
| 6,356,219 B1 | 3/2002 | Weibel IV et al. | 341/120 |

\* cited by examiner

*Primary Examiner*—Kevin Pyo
(74) *Attorney, Agent, or Firm*—Weingarten, Schurgin, Gagnebin & Lebovici LLP

(57) ABSTRACT

There is provided a measurement system in which the calibration data is easily incorporated into or obtained by the position sensing and/or displacement sensing system's processing unit. A scale-based encoder has a signal processor that corrects for scale inaccuracy based on a limited set of correction coefficients. The correction coefficients are the slopes and offsets that define a piecewise linear correction curve corresponding to the errors inherent in the scale. Several ways for communicating the coefficients to the processor are envisioned. Correction is applicable to linear or rotary encoders.

48 Claims, 10 Drawing Sheets

POSITION ENCODER WITH SCALE CALIBRATION

BACKGROUND OF THE INVENTION

1. Field of the Invention

The invention relates to a position sensing and/or displacement sensing system such as scale-based encoders, having a signal processor that corrects for scale inaccuracy. More particularly, the correction is based on a limited set of correction coefficients.

2. Related Art

Generally, this invention applies to the field of position sensing and/or displacement sensing systems, specifically scale based encoders or sensors. Scale based sensors are typically optical or magnetic and are characterized by having a scale (a component with "markings" of some sort), and a sensing head to read the markings on the scale. Other types of sensors, such as capacitive probes, measure displacement by the change in strength of some physical parameter, whereas scale based sensors measure displacement by observing the movement of the scale.

In a conventional system, the marks on the scale are periodic, thereby creating a periodic pattern that is observable by the sensor. The measured displacement of the periodic scale is proportional to the number of cycles of the observable pattern that the sensor observes during the displacement.

The accuracy of any particular individual scale-based sensor is affected by the specific scale. The accuracy over ranges which are medium to long relative to the period of the markings is closely related to the accuracy with which the markings are placed on the scale and the flatness of the scale. While the average accuracy of any scale is usually quite good, that is, the total number of marks over the length of the scale is well known, the accumulated error about the average is difficult to maintain at an acceptably low level.

Conventionally, long sensor scales have been calibrated with great care and the calibration data for a particular scale delivered to customers either as certification that the scale meets certain performance levels or as a means for the customer to back out the calibrated errors.

A simplified schematic diagram of an optical sensor 10 is shown in FIG. 1 for reference. The sensor includes a glass scale 100 on which there is a periodic array 110 of transmissive and opaque regions, a source of illumination 210 that illuminates the scale 100, an optical detector 250 with detecting elements 220 to sense the position of a fringe pattern 150 created by light passing through the periodic array 110, and a processor 300 that operates on the signals generated by the detecting elements 220. When the scale 100 moves relative to the light source/optical detector combination, the fringe pattern 150 moves proportionately. It is therefore motion of the fringe pattern that the sensor 10 uses to estimate displacement.

In addition to the periodic array 110, the scale 100 may include an indexing or reference mark 125. This mark identifies a specific known, fixed location along the scale 100 and allows the sensor to uniquely identify one cycle of the periodic array 110. The presence or passing of this mark is detected, typically by one or more detecting elements which form the index mark sensor 225, in the detector 250.

The processor 300 converts the detected signals from the detector 250 into estimates of scale displacement. Various processing algorithms can be used, depending on the specific form of the signals.

According to one method shown in the block diagram in FIG. 3, referring to systems such as shown in FIG. 1, the processor inputs the fringe data 305. At block 310, the algorithm first estimates the location of the scale modulo one period of the periodic array 110, known as the fractional cycle. At block 320, it determines if the scale has moved from one period of the array to an adjacent period. At block 330, it increments or decrements, as appropriate, an accumulator holding the number of periods of the periodic array that have passed since initialization. At block 340, the processor then adds the fraction cycle calculated in block 310 to the number of full cycles in the accumulator from block 330. The resulting scale displacement 355 is output.

Preferably, the processor 300 also accepts index mark sensor data signals 325 from the index mark sensor 325, and at block 315, it determines whether the index mark is present. Then, at block 350 it uses those signals to generate an initialization pulse to reset the accumulator.

For sensors in which the scale does not have an indexing mark, the accumulator is typically initialized by an external command 315a, generally when the scale is positioned at one end 101 of its range of travel, perhaps against a hard stop.

Although a linear displacement sensor is depicted in FIG. 1, it will be apparent to one skilled in the art that the same sensing and processing approach and principles are known in connection with rotary motion detection systems, as has been described in the literature.

SUMMARY OF THE INVENTION

The present invention provides a measurement system in which the calibration data is easily incorporated into or obtained by the position sensing and/or displacement sensing system's processing unit, so that the system provides the customer with highly accurate measurements without that customer's active intervention, even where the scale has known inaccuracy. The invention provides not only field replacement of a scale, but also sales of scales independently of sensors, with easy incorporation of the scale's calibration data into the processor.

The invention is a scale-based encoder with a signal processor or other processer that corrects or adjusts for scale inaccuracy based on a limited set of correction coefficients or other adjustment data. The correction coefficients are initially calculated, for example at the factory, but can be loaded subsequently into the encoder, such as when it is in the field. The correction coefficients are the slopes and offsets that provide a piecewise linear correction curve. Other data characteristic of adjustment data may alternatively be used. Several ways for communicating the coefficients to the processor are envisioned. Correction is applicable to linear or rotary encoders. The invention is applicable to alternative position sensors such as capactive encoders, magnetic encoders, inductive encoders, image processing encoders, etc.

In accordance with the invention, there is provided a method and system for detecting relative movement and correcting for scale inaccuracy. A scale is relatively movable with respect to a source with at least one detectable property. A periodic detector includes a sensing region positioned thereon, positioned relative to the scale to detect the detectable property, wherein the periodic detector detects and transmits a measure of displacement of the scale in response to a movement of the scale. A processor is operatively connected to the periodic detector, receiving the measure of displacement from the periodic detector, receiving calibration data corresponding to the scale indicative of an approximation correlating to the scale, the approximation including a plurality of segments, each of the segments corresponding to a portion of the scale, and converting the measure of displacement into a calibrated displacement using the correlation data.

In at least one embodiment, the approximation is linear and piecewise. The approximation may be a higher order approximation.

In at least one embodiment, the detectable property may include a periodic array of alternating regions, and the periodic array is linear.

In at least one embodiment, the detectable property may include a periodic array of alternating regions, and the periodic array is radial.

In at least one embodiment, a center of the radial array and a center of rotation are not coincident.

In at least one embodiment, the periodic detector transmits an analog signal representative of the measure of displacement, and the processor receives the analog signal as the measure of displacement.

In at least one embodiment, the processor further transmits an output representative of the calibrated displacement.

In at least one embodiment, the output representative of the calibrated displacement is a digital word of at least two bits representing a magnitude that is proportional to the relative displacement.

In at least one embodiment, the output representative of the calibrated displacement is at least one pulse train wherein an accumulated number of pulses is proportional to the relative displacement.

In at least one embodiment, the approximation includes information defining a plurality of locations on the scale at which the segments meet, information defining the slope of each segment, and information defining the offset of each segment. The approximation may include information defining a plurality of locations on the scale at which the segments meet, information defining a change in the slope of each segment, and information defining an offset between adjacent segments.

In at least one embodiment, there is included a microprocessor interface connection to the processor, wherein the processor receives the calibration data from the microprocessor interface.

In at least one embodiment, the processor has a means of being reset when the scale is in a pre-determined location so as to match the calibration data regarding the scale errors to the location on the scale.

In at least one embodiment, the processor selects, the calibration data corresponding to a particular position along the scale to remove the majority of the error in the output signal.

In at least one embodiment, the processor converts the measure of displacement to obtain the calibrated displacement using the piecewise approximation comprising a linear correction of the form: xc=ai*xr+bi, where xc is a corrected scale position, xr is a raw calculation of the scale position, and ai and bi are calibration coefficients included in the calibration data. The coefficients ai and bi may be i-th coefficients, selected from the calibration data when x(i−1) <xr<xi. The coefficients ai and bi may be calculated in the processor from a look-up table of differential coefficients using the formula: ai=a(i−1)+Di, bi=b(i−1)+Di, where Di is the i-th differential coefficient.

In at least one embodiment, the processor converts the measure of displacement to obtain the calibrated displacement using the piecewise approximation comprising a linear correction of the form: xc=xr+(ai*xr)+bi
where
xc is the corrected scale position,
xr is the raw calculation of the scale position,
ai and bi are calibration coefficients included in the calibration data. The coefficients ai and bi may be i-th coefficients, selected from the calibration data when x(i−1)<xr<xi. The coefficients ai and bi may be calculated in the processor from a look-up table of differential coefficients using the formula: ai=a(i−1)+Di, bi=b(I−1)+Di, where Di is the i-th differential coefficient.

According to at least one embodiment, the invention includes an index location indicator on the scale, and a second sensing region on the periodic detector positioned relative to the index location indicator, the second sensing region being capable of detecting the index location indicator on the scale.

In at least one embodiment, the processor resets the measure of displacement based on the index location indicator.

In at least one embodiment, there is provided a machine-readable storage, and the calibration data are stored in the machine-readable storage.

In at least one embodiment, the machine-readable storage is positioned on the scale, and there is provided a means for reading the calibration data in the machine-readable storage.

In at least one embodiment, the second sensing region transmits the detected index location, and the processor, responsive to receipt of the transmitted detected index location, resets the measure of displacement.

These and other objects, features and advantages of the present invention are readily apparent from the following drawings and detailed description of the preferred embodiments.

DESCRIPTION OF THE FIGURES

The above-mentioned and other advantages and features of the present invention will become more readily apparent from the following detailed description and the accompanying drawings, in which.

DETAILED DESCRIPTION OF THE PREFERRED EMBODIMENT

The following detailed description of the preferred embodiment includes many specific details. The inclusion of such details is for the purpose of illustration only and should not be understood to limit the invention. Throughout this discussion, similar elements are referred to by similar numbers in the various figures for ease of reference.

Figure 1:
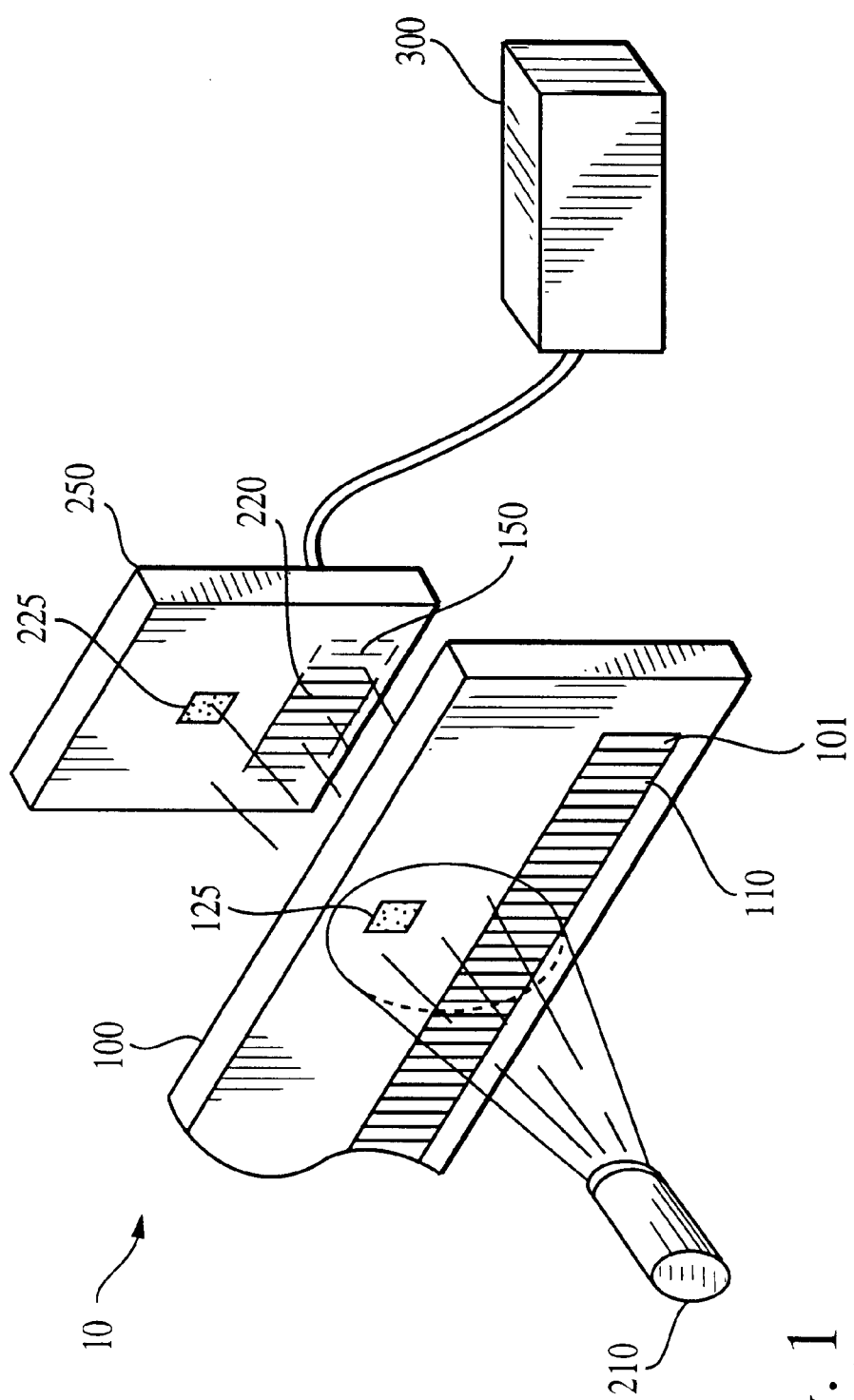
FIG. 1 is an isometric view of an optical sensor.

For the optical sensor in FIG. 1, for which the disadvantages have been discussed above, the movement of the fringe pattern 150 is simply an indirect measure of the movement of the scale or the periodic array 110.

Analogously, for a magnetic scale, the motion of the scale is sensed from periodic changes in magnetic field strength. The principles of both optic and magnetic sensors are sufficiently analogous that the present invention applies to both types of systems, and indeed, to any system where there is a detectable motion of a scale. Since the invention is a scale-based displacement sensor in which accuracy errors in the scale are internally removed, this invention is not limited by the displacement sensing principle used.

The displacement estimates produced by any scale-based sensor are conventionally based on directly or indirectly counting the full and fractional cycles of the periodic array 110 on the scale 100 that have moved past the fixed detector 220 location. It has been determined by the inventors that any errors in the spacing of the elements in the periodic array create inaccuracies in the measurement.

Figure 2:
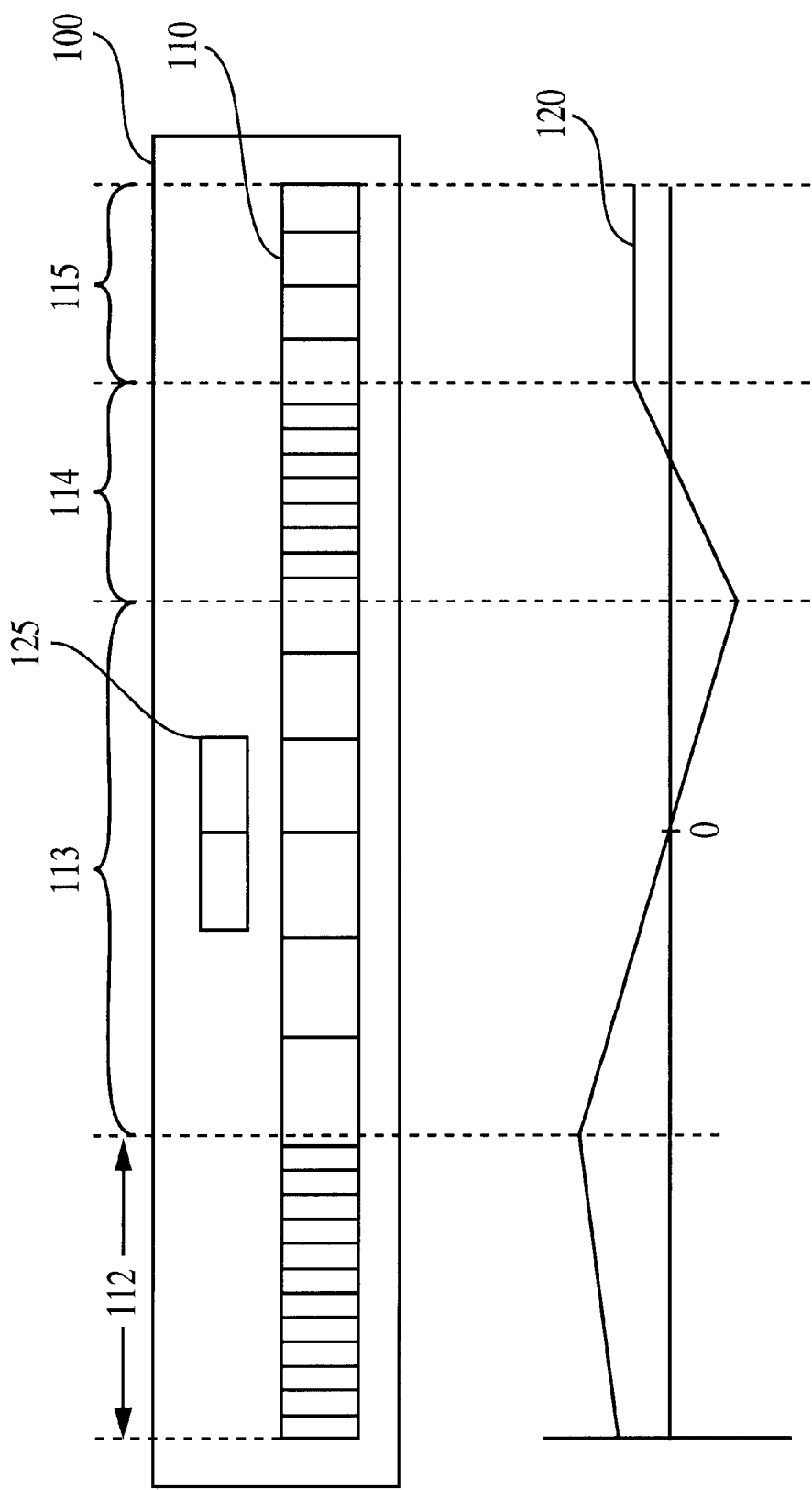
FIG. 2 is schematic illustration of exemplary scale inaccuracies.
Figure 3:
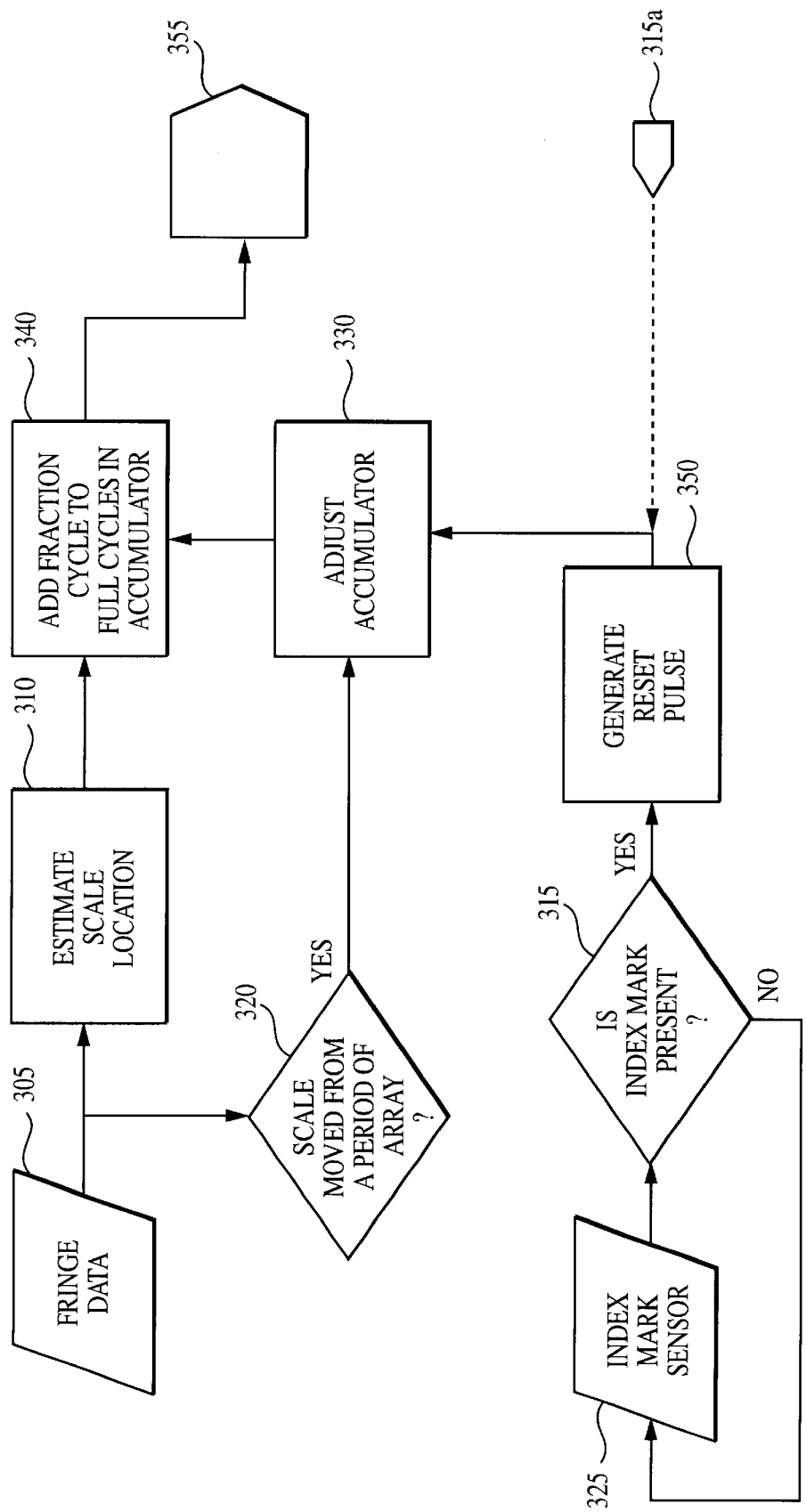
FIG. 3 is a block diagram of a scale displacement processing algorithm.

These inaccuracies are shown schematically in FIG. 2 for an exemplary scale 100 on which the periodic elements in the periodic array 110 occur in regions of varying combinations of close spacing, wide spacing, and/or normal spacing. In the illustrated example, the periodic element regions are first relatively closely spaced 112, then relatively widely spaced 113, then relatively closely spaced again 114, and then normally spaced 115. FIG. 2 also shows a corresponding error function, 120, which is a piecewise linear function. In the illustrated example, each alternation between periodic element regions of close spacing, wide spacing or normal spacing results in an endpoint of a linear segment in the linear function.

Real error functions have much higher frequency variations, but for many scales the accuracy error function can be well approximated by a piecewise linear function with a limited number of pieces, or corresponding segments of the periodic array. In the particular example, there are four pieces. It is anticipated that between two and ten pieces will result in acceptable functionality without requiring a large number of calculations. However, larger numbers of pieces are possible as well. One will consider the trade-off between the higher degree of accuracy obtained by a large number of segments, and the storage space required to store the calculated information corresponding to the segments.

Figure 4A:
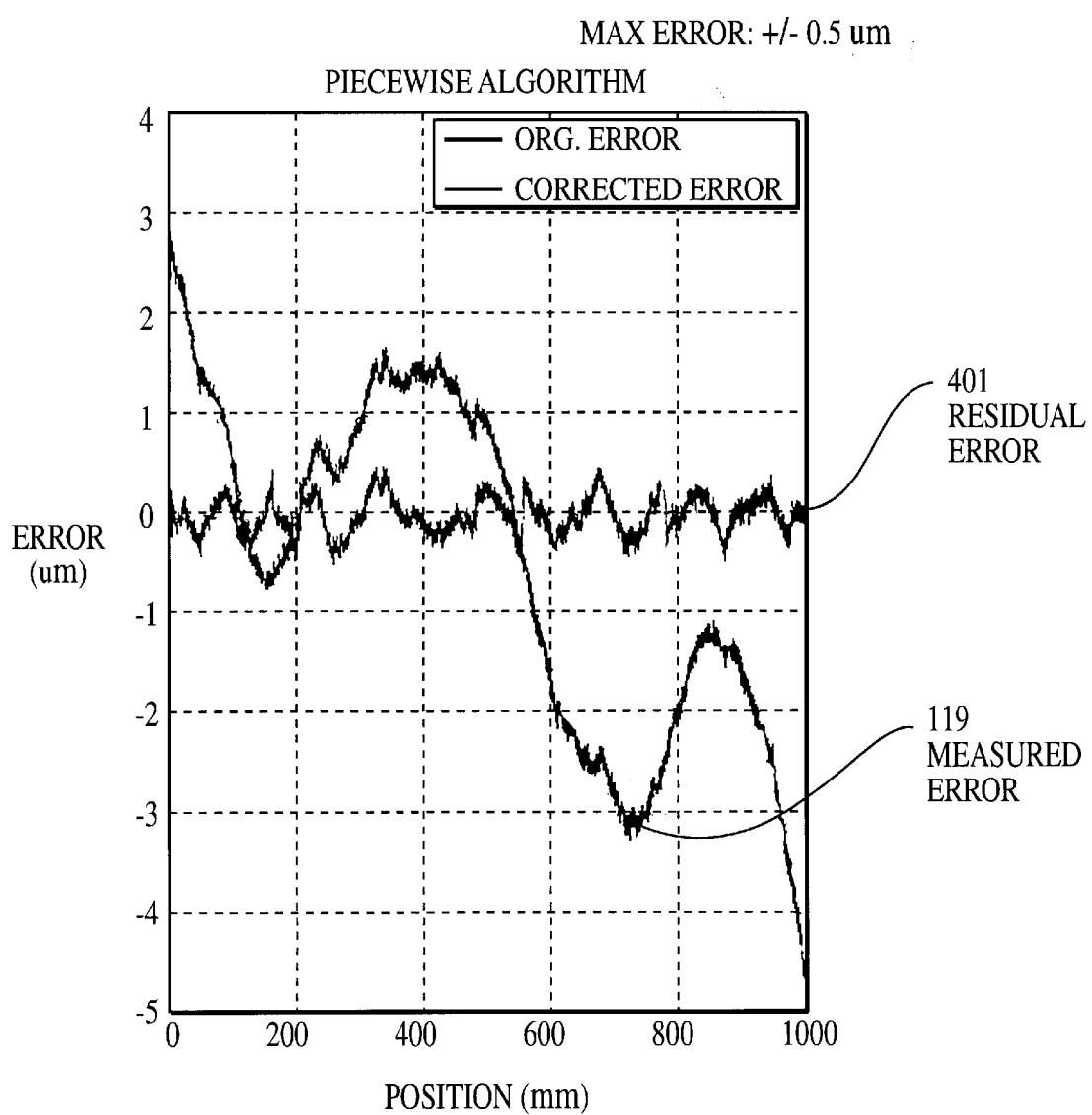
FIGS. 4A and 4B are an exemplary linear piecewise function.
Figure 4B:
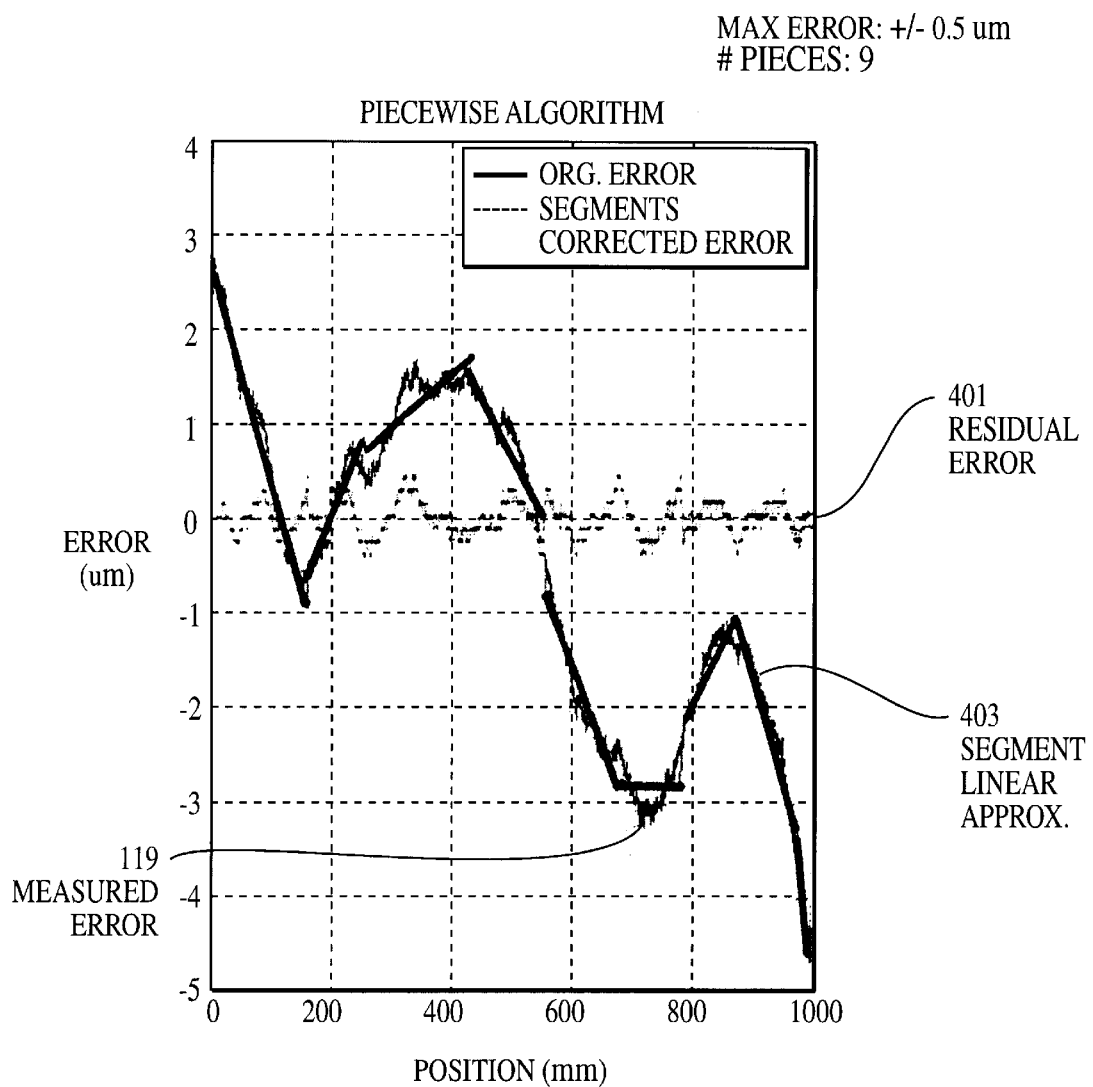

FIGS. 4A and 4B show the measured error 119 for an exemplary one-meter long glass scale utilizing the piecewise linear approximation function 120. The errors in the glass scale have been measured. FIG. 4A shows the residual error 401 after calibration, and the measured error 119. In FIG. 4B, the piece-wise linear function used to generate the segments has produced nine linear segments 403, based on the measured error 119.

The same accuracy errors apply in connection with rotary scales. In addition, most rotary scales typically have a once-per-revolution accuracy error that is proportional to decentration of the scale pattern and the true center of rotation. This decentration error is no different in nature from other fixed scale accuracy errors. By use of the present invention, the decentration errors as well as accuracy errors will be calibrated out.

Figure 5:
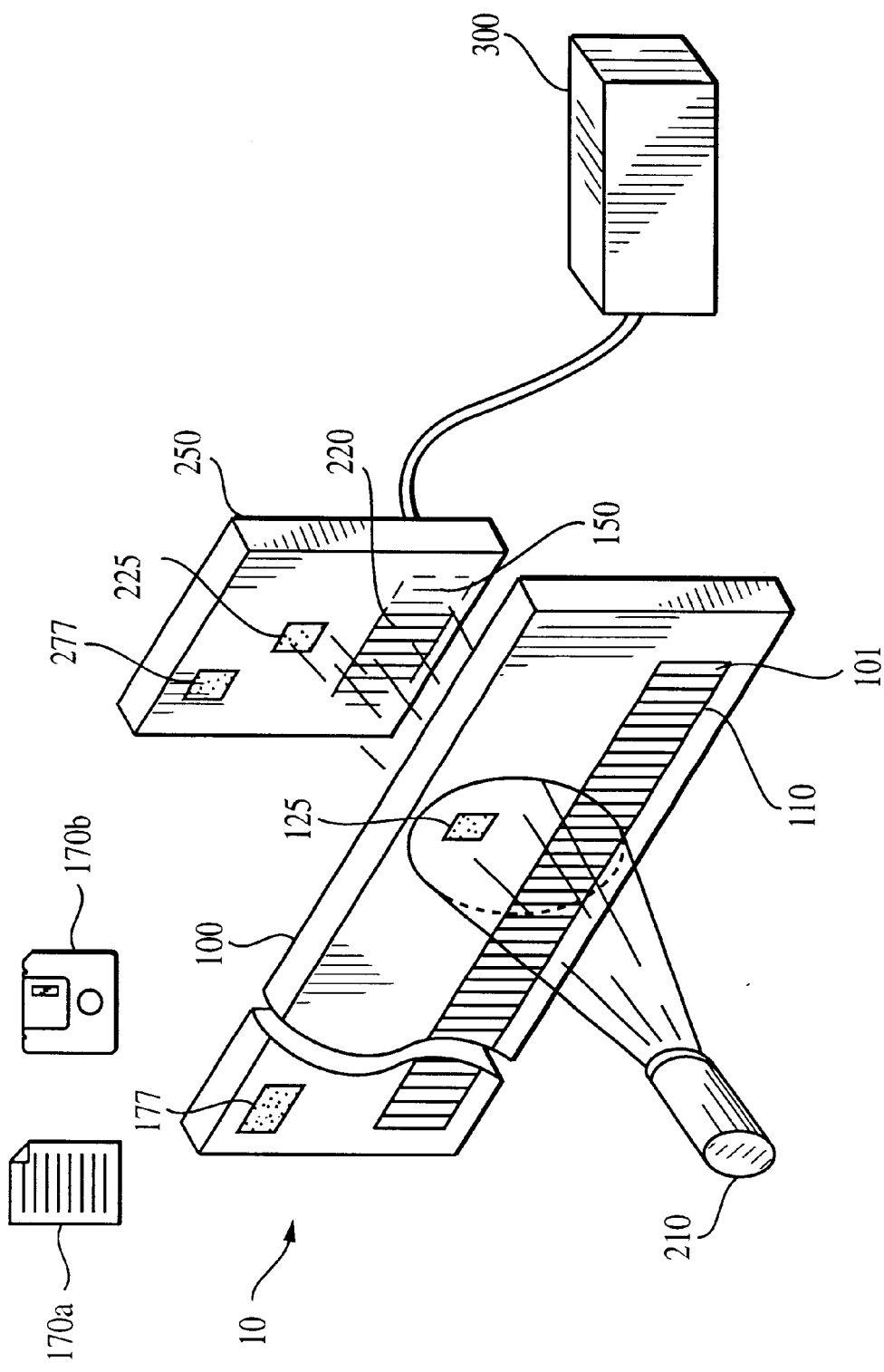
FIG. 5 is an isometric view of the optical sensor of the present invention.

FIG. 5 shows one implementation of the present invention. An optical sensor is mentioned for descriptive purposes only, however, one of skill in the art will appreciate that other standard sensors are possible. The sensor 10 includes, as in FIG. 1, a scale 100, a source of illumination 210, an optical detector 220, and a processor 300.

A data table corresponds to the scale 100, and contains calibration data for that particular scale. The calibration is advantageously performed, typically, at the factory or at some other appropriate initial time. The data table can exist in many forms. For example, it could be supplied as a human readable printed table 170a. Preferably, however, it is provided in a machine readable format, e.g., an electronic format readable by computer, such as a floppy disk 170b or CD-ROM. The data could also be made available over communication links such as the Internet. According to one alternative, the data table could be attached directly to the scale 100, for example as a machine-readable coded label 177. Alternative means of incorporating the coded data together with the scale are envisioned. As one can appreciate from the foregoing, the scale may be supplied with the data attached, or with the data held separately.

As shown in FIG. 5, the detector 220 may include a standard reader or other means for reading the machine-readable label 177. This means could use separate detection elements 277 or, with a compatible coding scheme, the data on the label could be read using the periodic array detecting elements 220 or the indexing mark detecting elements 225.

Figure 6:
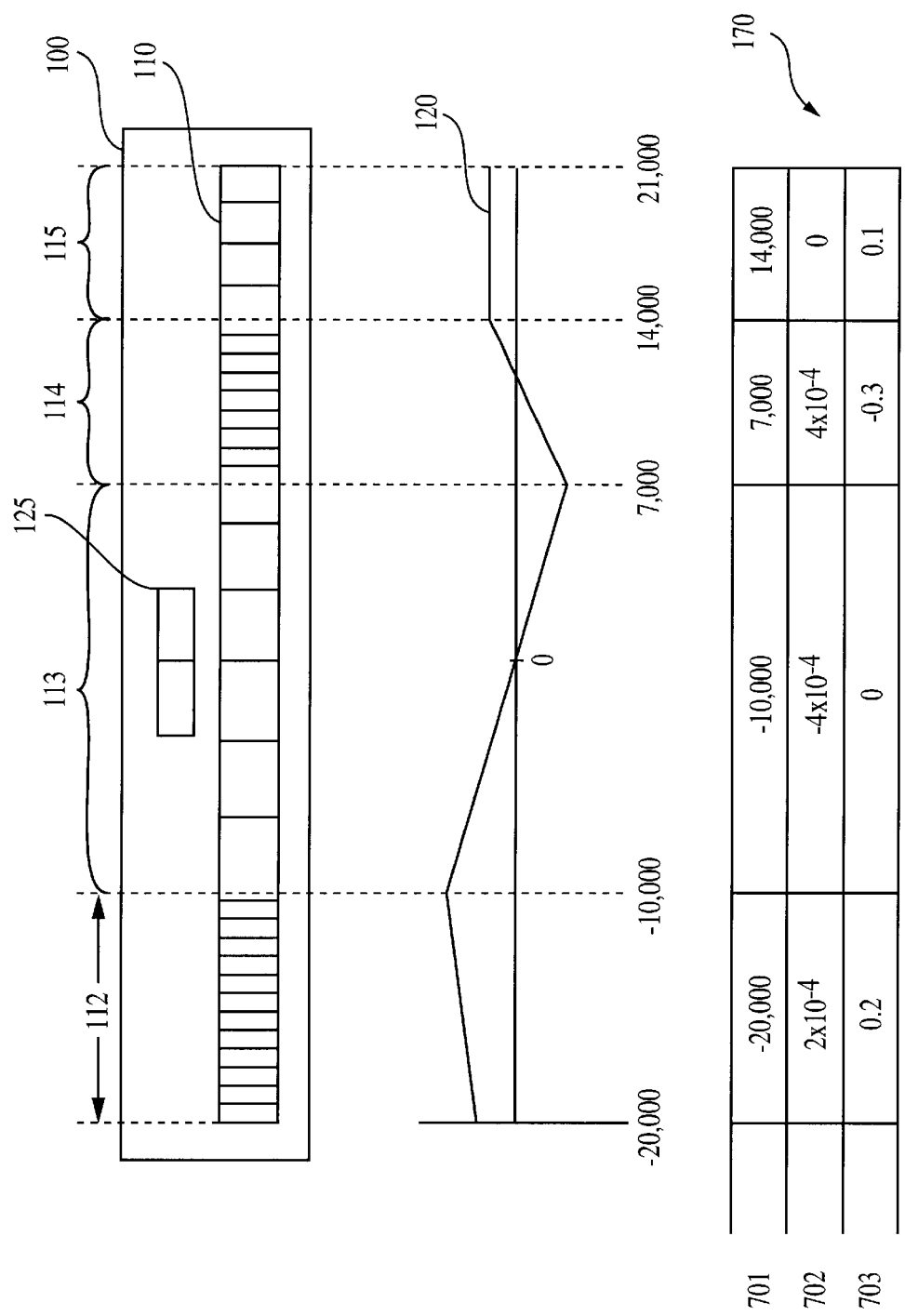
FIG. 6 is a schematic illustration of exemplary scale inaccuracies, measured piecewise linear function and corresponding data table.

Reference is made to FIG. 6, showing the exemplary scale 100 with periodic array 110 and reference mark 125 of FIG. 2; a corresponding measured piecewise linear function; and a corresponding data table. The data in the data table contains information sufficient to reproduce the piecewise linear error function 120. In at least one embodiment, the table includes a column corresponding to each segment 112–115 of the function; and a row for the count number 701 (number of periods) of the transition between segments, a row for the error segment slope 702, and a row for the intercept (or offset) of the error segment 703. Thus, each column in the table describes the slope and offset of one segment of the function 120, along with a way to locate or identify the segment. For example, FIG. 6 shows an example of what the data table 170 might look like. Preferably, these values are referenced to the scale location indicated by the indexing mark 125, as one appropriate way to locate each segment. One of skill in the art will appreciate that there are alternative ways to represent a piecewise linear function.

Figure 7:
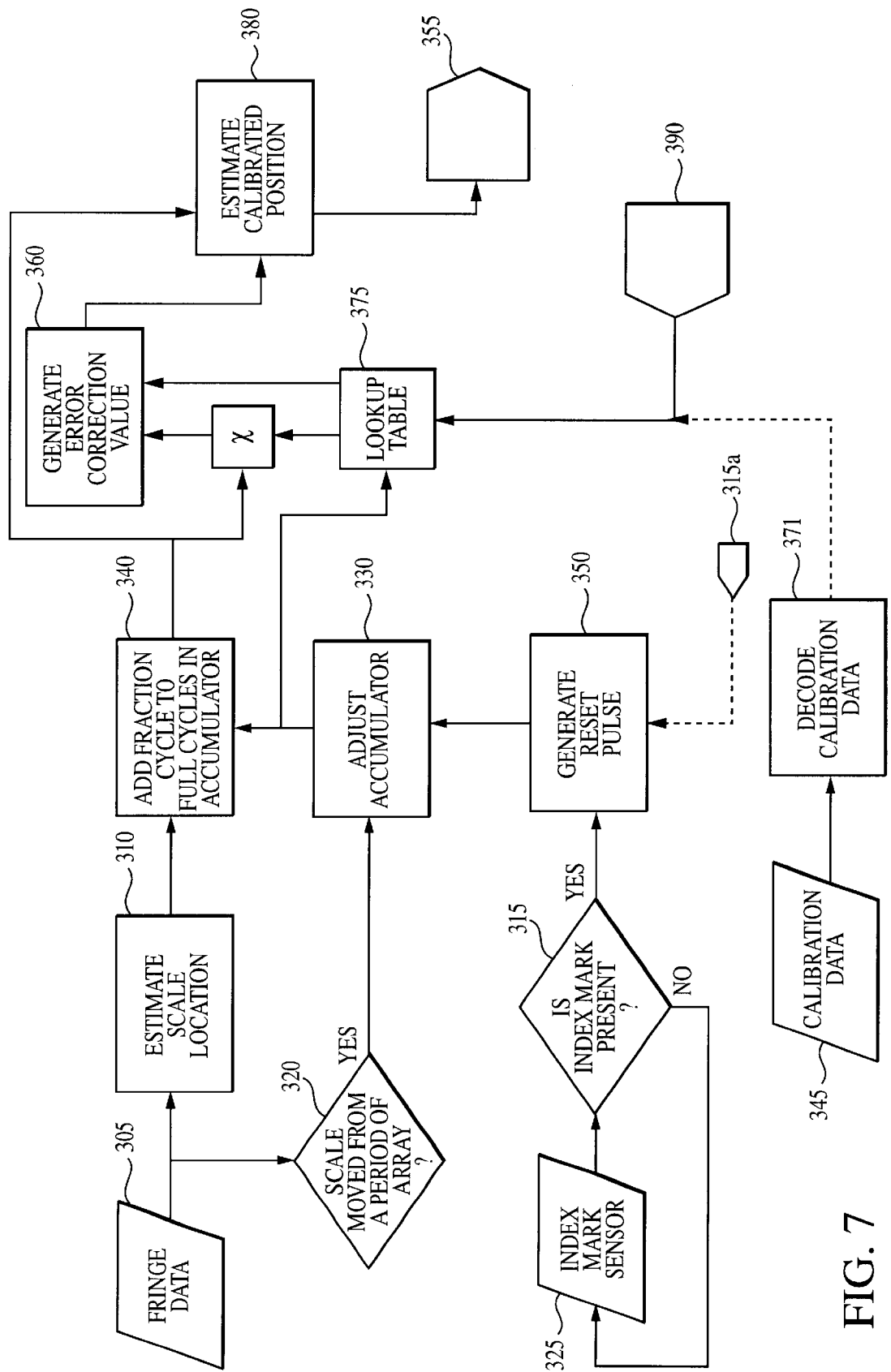
FIG. 7 is a block diagram of one scale displacement processing algorithm of the present invention.

FIG. 7 shows a method for estimating the calibrated location, utilizing fringe data input 305, and is readily performed in the processor 300 that is used in the invention. Preferably, as shown in the block diagram in FIG. 7, at block 310, an estimation algorithm first estimates the location of the scale modulo one period of the periodic array 110 (known as the fractional period or fraction cycle). Next, at block 320, it is determined if the scale has moved from one period of the array to an adjacent period. At block 330, if the scale has moved, an accumulator holding the number of periods of the periodic array that have passed since initialization is incremented or decremented, as appropriate. At block 340, the processor then adds the fractional cycle calculated in block 310 to the number of full cycles in the accumulator.

Preferably, the processor 300 also accepts signals 325 from the index mark sensor 225 and at block 315 uses those signals to generate an initialization pulse in order to reset the accumulator 350. As one alternative for sensors in which the scale does not utilize an indexing mark, the accumulator may be initialized by an external command 315a, preferably when the scale is positioned at one end 101 of its range of travel on the scale, such as against a hard stop.

Further, the processor 300 preferably has a look-up table memory 390 into which the calibration data table 170 has been loaded. At block 375, for each measurement of fringe data, the processor uses the current value of the accumulator to access the corresponding values in the lookup table. At block 360, the error correction value is generated by multiplying the current value of the accumulator by the slope and adding the offset. At block 380, the error correction value is applied to the raw position estimate of block 340 to create the calibrated position estimate 355.

This calibration approach can be represented by the mathematical formula $$P_c = P_A + P_f + S_i \times P_A + O_i$$

where $P_c$ is the calibrated period value $P_A$ is the accumulated period count $P_f$ is the fractional period $S_i$ and $O_i$ are the slope and offset for the $i^{th}$ segment of the piecewise linear calibration function.

It should be clear to one skilled in the art that there are alternative but equivalent mathematical methods of incorporating the piecewise linear calibration data into the raw position estimate and that these alternative methods fall within the scope of this invention. Further, there are alternative methods to measure each variable used in the calibration, e.g., period, fractional period, slope and offset; these may be used and are still within the scope of the invention. For example, the present invention uses the current value of the accumulator, the slope and offset as variables in determining the error correction value. Accordingly, alternative or modified processes using these variables to obtain the error correction value are within the scope of the present invention. Further, alternative variables may be used that are indicative of, or similar to, the variables described herein, or as described in more detail below.

Preferably, the processor 300 has an interface 390 through which it can communicate with an external electronic computer. This interface may be used to transfer various information between the sensor 10 and the external environment. Preferably, this interface is used to load the calibration table data 170 into a re-programmable memory device from which the look-up table 375 may be accessed. As one alternative, the memory device could be a single use memory device (such as a read-only memory (ROM)) that is delivered with the scale 100 and physically installed into the processor.

Another approach for loading the re-programmable memory is used when the scale has the look-up table data encoded on it in a format that is read by the detector 250. In this mode of operation, the processor accepts the calibration data 345, decodes the calibration data at block 371, and then loads the decoded data into the storage device autonomously.

Figure 8:
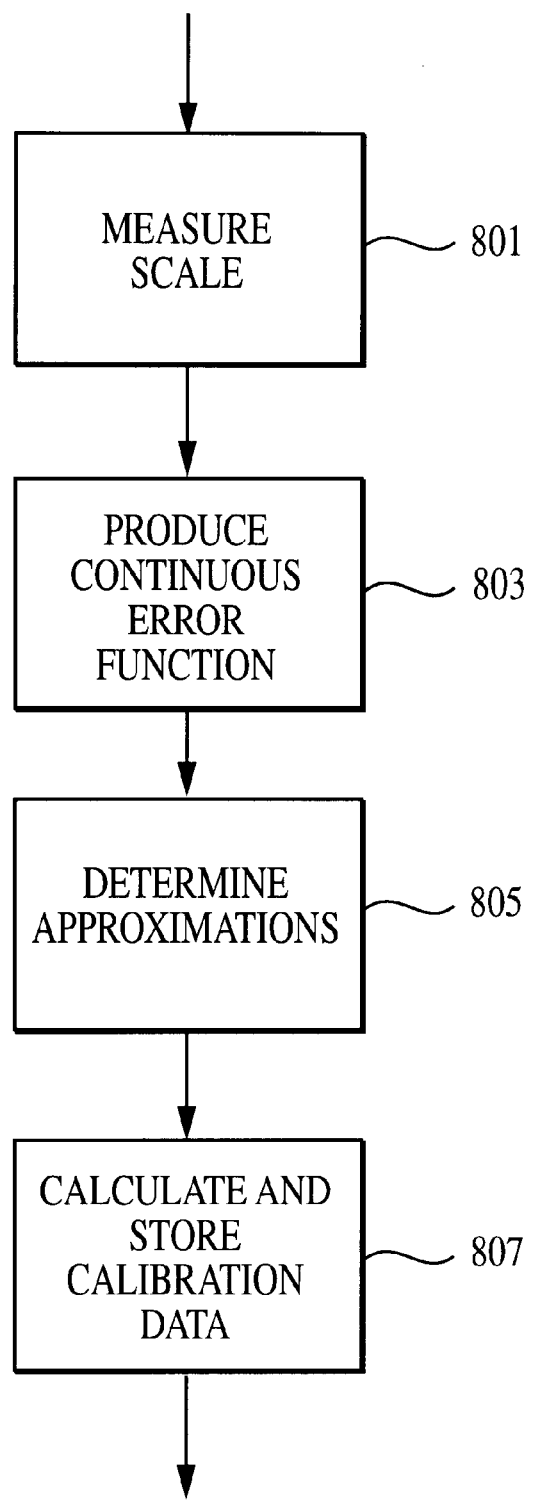
FIG. 8 is a block diagram showing a method of creating the piecewise linear data table.

Generating calibration values may be performed as follows, with reference to FIG. 8, which illustrates an exemplary method of creating the piecewise linear data table. These steps preferably occur at the factory when the scales are initially manufactured, and result in an encoder with separate calibration data. At step 801, the factory measures the scale against a truth sensor, such as a laser interferometer. At step 803, the true position is subtracted from the measured position to produce a continuous error function, such as illustrated in FIG. 4A. At step 805, the continuous function approximation is determined. For example, a segment of the scale is determined by a change in spacing of the grating between fine, wide and normal spacing; and a best fit is performed for each segment. At step 807, the calibration data (slopes, offsets, segment starting points) for each segment of the scale is determined and stored.

Figure 9:
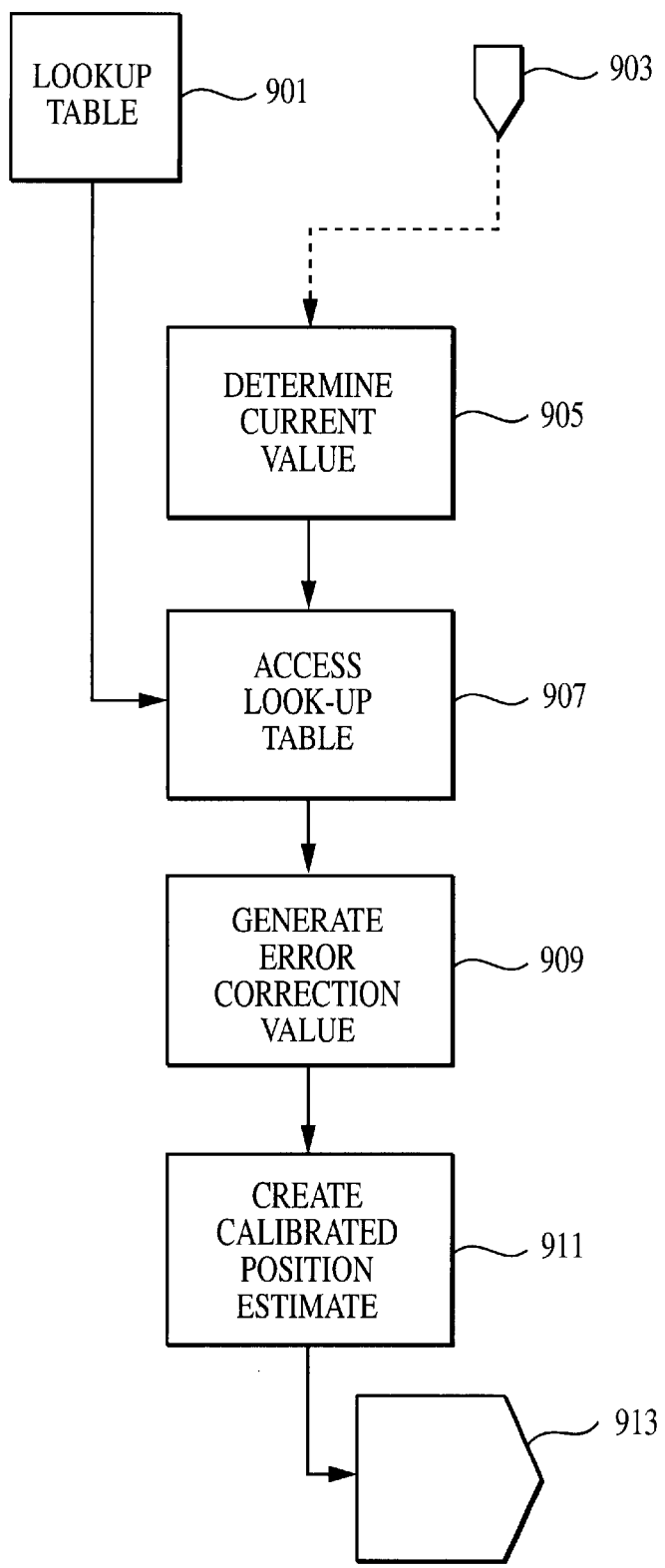
FIG. 9 is a block diagram showing a method of loading the piecewise linear data table.

FIG. 9 is a block diagram showing a method of using the piecewise linear data table. Preferably, these steps occur after the position encoder has been set up in the field. The calibration data is available in the look-up table 901. At block 903, scale measurements are continuously sampled. At block 905 the processor determines the current value based on the measurement. At block 907, the processor accesses the look-up table. At block 909, the processor generates the error correction value based on the current value used to index into the look-up table. At block 911, the processor determines the calibrated position estimate utilizing an appropriate formula and values, as discussed in detail. The calibrated position estimate is then output at block 913.

The present invention has been described above in connection with one embodiment. Nevertheless, one will appreciate that numerous variations are possible and remain within the scope of the appended claims. Some of the contemplated variations are discussed below, but are not intended to be limitative of the scope of the invention.

The position encoder has been described as a specific example. However, it may be any position encoder or position identification device that optionally includes automatic compensation for scale inaccuracies, and may optionally include any type of moving scale or grating having a periodic linear or radial array of alternating regions with some detectable property.

One of skill in the art will appreciate that there are a number of types of standard sensing means or sensors capable of detecting the movement of the moving scale based on the movement of the regions of detectable property.

The invention has been discussed in connection with a processor capable of converting the output of the sensing means into a measure of the displacement of the underlying scale. This processor is further capable of correcting, by means of a supplied calibration, accuracy errors in the periodicity of the array of regions on the scale. Any computer, microprocessor or processing chip is appropriate. The methods may be embodied as hardware, software, firmware or a combination thereof.

The scale may be an optical scale, and has alternating regions of high and low transmission or high and low reflectivity, or regions of alternating values of optical phase delay. The periodicity of the scale contains accuracy errors, which can be measured and/or recorded in a calibration system. The scale may be linear, or it may be rotary, where the center of the scale and the center of rotation are not coincident.

Alternative position sensors or encoders are also applicable to the invention. Such include, for example, capacitive encoders, magnetic encoders, inductive encoders, and encoders using image processing.

Preferably, the processor may accept analog signals from the sensor and produce a representation of the displacement of the scale relative to the sensor. Preferably, one output of the processor is a digital word of at least 2 bits whose magnitude is proportional to the relative displacement (or calibrated output). As another alternative, the output of the processor may be digital, for example, one or more pulse trains wherein the accumulated number of pulses is proportional to the relative displacement, accommodation having been made to both increase and decrease the accumulated count.

The look-up table could be implemented in different ways. For example, the look-up table could contain the scale locations at which the segments of the approximation function meet and the slope(s) and offset(s) that define the linear approximation function. Alternatively, the look-up table could contain the scale locations at which the segments of the approximation function meet and the change(s) in the slope and offset between the adjacent segments. Further, in addition to, or in the alternative, a conventional database and/or indexing process may be used.

According to another possible variation, the processor applies a linear correction of the form $$xc = ai*xr + bi$$

where xc is the corrected scale motion xr is the raw calculation of the scale motion ai and bi are supplied calibration coefficients Alternatively, the coefficients ai and bi are i-th coefficients, selected from the look-up table when x(i−1) <xr<xi. According to yet another alternative, the coefficients ai and bi are calculated in the processor from a look-up table of differential coefficients using the formula: ai=a(i−1)+Di, where Di is the ith differential coefficient.

According to another embodiment, the invention includes another sensing means or sensor capable of reading the machine readable calibration data listing on the scale. This processor is further capable of recognizing the position of the indexing or reference location indicator and resetting the correction it applies to the measured displacement, and is further capable of interpreting the machine readable calibration listing on the scale. The scale further includes a region in which previously measured calibration data is included in a machine readable format.

According to another option, the lookup table is loaded into the processor from the machine readable data attached to the scale, as read by the third sensing means.

The invention has been described in connection with a piecewise linear function. Other piecewise approximations may be used, such as substituting segments of higher order. For example, a first order function is linear, a second order function is parabolic, etc. As another alternative, the segments need not be a uniform length.

While this invention has been described in conjunction with the specific embodiments outlined above, many alternatives, modifications and variations will be apparent to those skilled in the art. Accordingly, the preferred embodiments of the invention as set forth above are intended to be illustrative, and not limiting. Various changes may be made without departing from the spirit and scope of the invention as defined in the following claims.

What is claimed is:

1. A device for detecting relative movement and correcting for scale inaccuracy, comprising:
   (A) an optical scale relatively movable with respect to a source, having a periodic array of alternating regions with a detectable optical property;
   (B) a periodic detector having a sensing region positioned thereon, positioned relative to the scale to detect the detectable property, wherein the periodic detector detects and transmits a measure of displacement of the scale in response to a movement of the scale; and
   C) a processor, operatively connected to the periodic detector, receiving the measure of displacement from the periodic detector, receiving calibration data corresponding to the scale indicative of a linear piecewise approximation correlating to the scale, the piecewise approximation including a plurality of segments, each of the segments corresponding to a portion of the scale, the calibration data including information a location on the scale of each segment and information defining the slope of each segment; and converting the measure of displacement into a calibrated displacement using the calibration data.

2. The device as claimed in claim 1, wherein the detectable property includes a periodic array of alternating regions, and the periodic array is linear.

3. The device as claimed in claim 1, wherein the detectable property includes a periodic array of alternating regions, and the periodic array is radial.

4. The device as claimed in claim 1, wherein a center of the radial array and a center of rotation are not coincident.

5. The device as claimed in claim 1, wherein the periodic detector transmits an analog signal representative of the measure of displacement, and wherein the processor receives the analog signal as the measure of displacement.

6. The device as claimed in claim 1, wherein the processor further transmits an output representative of the calibrated displacement.

7. The device as claimed in claim 6, wherein the output representative of the calibrated displacement is a digital word of at least two bits representing a magnitude that is proportional to the relative displacement.

8. The device as claimed in claim 6, wherein the representative of the calibrated displacement is at least one pulse train wherein an accumulated number of pulses is proportional to the relative displacement.

9. The device as claimed in claim 1, wherein the approximation includes information defining a plurality of locations on the scale at which the segments meet, information defining the slope of each segment, and information defining the offset of each segment.

10. The device as claimed in claim 1, wherein the approximation includes information defining a plurality of locations on the scale at which the segments meet, information defining a change in the slope of each segment, and information defining an offset between adjacent segments.

11. The device as claimed in claim 1, further comprising a microprocessor interface connection to the processor, wherein the processor receives the calibration data from the microprocessor interface.

12. The device as claimed in claim 1, wherein the processor has a means of being reset when the scale is in a pre-determined location so as to match the calibration data regarding the scale errors to the location on the scale.

13. The device as claimed in claim 1, wherein the processor selects the calibration data corresponding to a particular position along the scale to remove the majority of the error in the output signal.

14. The device as claimed in claim 1, wherein the processor converts the measure of displacement to obtain the calibrated displacement using the piecewise approximation comprising a linear correction of the form: xc=*xr+bi, where xc is a corrected scale position, xr is a raw calculation of the scale position, and ai and bi are calibration coefficients included in the calibration data.

15. The device as claimed in claim 14, wherein the coefficients ai and bi are i-th coefficients, selected from the calibration data when x(i−1)<xr<xi.

16. The device as claimed in claim 14, wherein the coefficients ai and bi are calculated in the processor from a look-up table of differential coefficients using the formula: ai=a(i−1)+Di, bi=b(i−1)+Di, where Di is the i-th differential coefficient.

17. The device as claimed in claim 1, wherein the processor converts the measure of displacement to obtain the calibrated displacement using the piecewise approximation comprising a linear correction of the form:

xc=xr+(ai*xr)+bi where
  xc is the corrected scale position,
  xr is the raw calculation of the scale position,
  ai and bi are calibration coefficients included in the calibration data.

18. The device as claimed in wherein claim 17, wherein the coefficients ai and bi are i-th coefficients, selected from the calibration data when x(i−1)<xr<xi.

19. The device as claimed in claim 17, wherein the coefficients ai and bi are calculated in the processor from a look-up table of differential coefficients using the formula: ai=a(i−1)+Di, bi=b(I−1)+Di, where Di is the i-th differential coefficient.

20. The device as claimed in claim 1, further comprising an index location indicator on the scale, and a second sensing region on the periodic detector positioned relative to the index location indicator, said second sensing region capable of detecting the index location indicator on the scale.

21. The device as claimed in claim 20, wherein the processor resets the measure of displacement based on the index location indicator.

22. The device as claimed in claim 1, further comprising a machine-readable storage, wherein the calibration data are stored in the machine-readable storage.

23. The device as claimed in claim 22, wherein the machine-readable storage is positioned on the scale, and further comprising means for reading the calibration data in the machine-readable storage.

24. The device as claimed in claim 20, wherein the second sensing region transmits the detected index location, and wherein the processor, responsive to receipt of the transmitted detected index location, resets the measure of displacement.

25. A method of detecting relative movement and correcting for scale inaccuracy, comprising the steps of:
  (A) providing an optical scale relatively movable with respect to a source, having a periodic array of alternating regions with a detectable optical property;
  (B) providing a periodic detector having a sensing region positioned thereon, positioned relative to the scale to detect the detectable property, wherein the periodic detector detects and transmits a measure of displacement of the scale in response to a movement of the scale;
  (C) providing calibration data indicative of a linear piecewise approximation correlating to the scale, the piecewise approximation including a plurality of segments, each of the segments corresponding to a portion of the scale, the calibration data including information defining a location on the scale of each segment and information defining the slope of each segment; and
  (D) receiving in a processor operatively connected to the periodic detector, the measure of displacement from the periodic detector, receiving calibration data corresponding to the scale, and converting the measure of displacement into a calibrated displacement using the calibration data.

26. The method as claimed in claim 25, wherein the detectable property includes a periodic array of alternating region, and the periodic array is linear.

27. The method as claimed in claim 25, wherein the detectable property includes a periodic array of alternating regions, and the periodic array is radial.

28. The method as claimed in claim 27, wherein a center of the radial array and a center of rotation are not coincident.

29. The method as claimed in claim 25, further comprising the step of transmitting, from the periodic detector, an analog signal representative of the measure of displacement.

30. The method as claimed in claim 25, further comprising the step of transmitting, from the processor, an output representative of the calibrated displacement.

31. The method as claimed in claim 30, wherein the output representative of the calibrated displacement is a digital word of at least two bits representing a magnitude that is proportional to the relative displacement.

32. The method as claimed in claim 30, wherein the output representative of the calibrated displacement is at least one pulse train wherein an accumulated number of pulses is proportional to the relative displacement.

33. The method as claimed in claim 25, wherein the approximation includes defining a plurality of locations on the scale at which the segments meet, information defining the slope of each segment, and information defining the offset of each segment.

34. The method as claimed in claim 25, wherein the approximation includes information defining a plurality of locations on the scale at which the segments meet, information defining a change in the slope of each segment, and information defining an offset between adjacent segments.

35. The method as claimed in claim 25, further comprising the step of receiving, at a microprocessor interface connection to the processor, the calibration data from the microprocessor interface.

36. The method as claimed in claim 25, further comprising the step of resetting when the scale is in a pre-determined location so as to match the calibration data regarding the scale errors to the location on the scale.

37. The method as claimed in claim 25, further comprising the step of selecting the calibration data corresponding to a particular position along the scale to remove the majority of the error in the output signal.

38. The method as claimed in claim 25, wherein the processor converts the measure of displacement to obtain the calibrated displacement using the piecewise approximation comprising a linear correction of the form:
  xc=ai*xr+bi where xc is the corrected scale position,
  xr is the raw calculation of the scale position, and ai and bi are calibration coefficients included in the calibration data.

39. The method as claimed in claim 38, wherein the coefficients ai and bi are i-th coefficients, selected from the calibration data when x(i−1)<xr<xi.

40. The method as claimed in claim 38, wherein the coefficients ai and bi are calculated in the processor from a look-up table of differential coefficients using the formula: ai=a(i−1)+Di, bi=b(i−1)+Di, where Di is the i-th differential coefficient.

41. The method as claimed in claim 25, wherein the processor converts the measure of displacement to obtain the calibrated displacement using the piecewise approximation comprising a linear correction of the form:
  xc=xr+(ai*xr)+bi where
    xc is the corrected scale position,
    xr is the raw calculation of the scale position,
    ai and bi are calibration coefficients included in the calibration data.

42. The method as claimed in claim 41, wherein the coefficients ai and bi are i-th coefficients, selected from the calibration data when x(i−1)<xr<xi.

43. The method as claimed in claim 41, wherein the coefficients ai and bi are calculated in the processor from a look-up table of differential coefficients using the formula: $ai=a(i-1)+Di$, $bi=b(i-1)+Di$ where Di is the i-th differential coefficient.

44. The method as claimed in claim 25, further comprising an index location indicator on the scale, and a second sensing region on the periodic detector positioned relative to the index location indicator, said second sensing region capable of detecting the index location indicator on the scale.

45. The method as claimed in claim 44, further comprising the step of resetting the measure of displacement based on the index location indicator.

46. The method as claimed in claim 25, further comprising the step of storing the calibration data in a machine-readable storage.

47. The method as claimed in claim 46, wherein the machine-readable storage is positioned on the scale, and further comprising the step of reading the calibration data in the machine-readable storage.

48. The method as claimed in claim 44, further comprising the step of transmitting, from the second sensing region, the detected index location, and responsive to receipt of the transmitted detected index location, resetting the measure of displacement.

* * * * *